Figure 3:
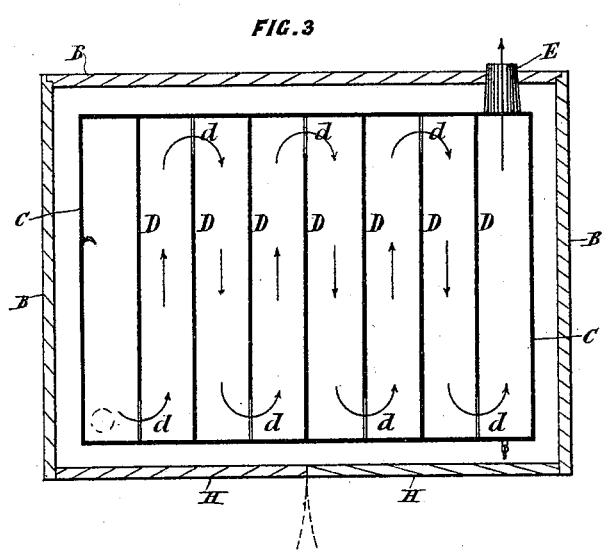

(No Model.) 2 Sheets—Sheet 1.
T. GRIFFITHS.
GREASE TRAP OR INTERCEPTER.
No. 460,673. Patented Oct. 6, 1891.
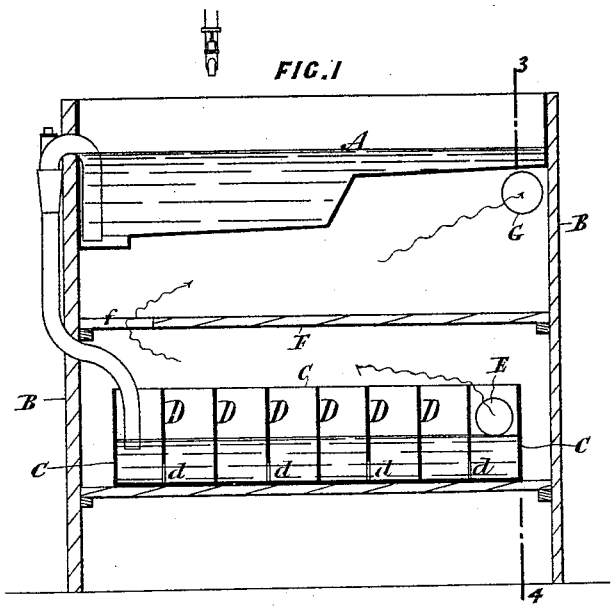
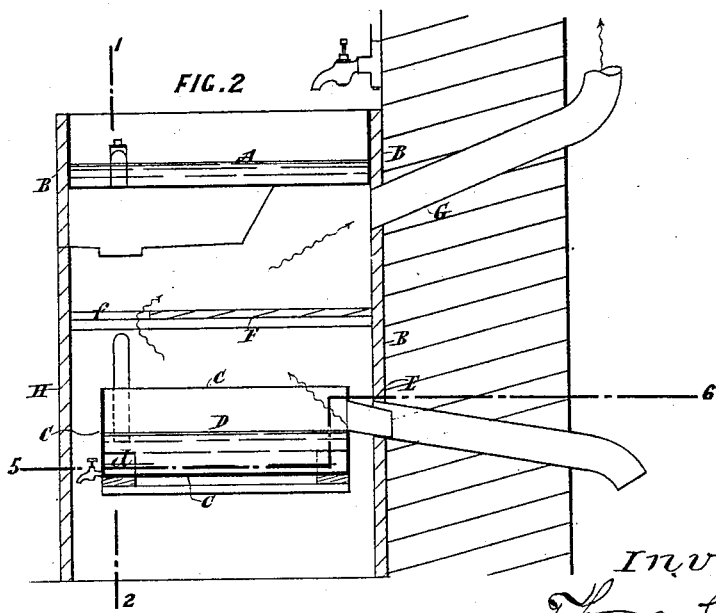
Witnesses:
E. B. Bolton
E. K. Sturtevant
Inventor:
Thomas Griffiths
By Richard G.
his Attorneys.

(No Model.) 2 Sheets—Sheet 2.
T. GRIFFITHS.
GREASE TRAP OR INTERCEPTER.

No. 460,673. Patented Oct. 6, 1891.

Witnesses:
E. B. Bolton
E. K. Sturtevant

Inventor:
Thomas Griffiths
By Richard
his Attorneys

UNITED STATES PATENT OFFICE.

THOMAS GRIFFITHS, OF SYDNEY, NEW SOUTH WALES.

GREASE TRAP OR INTERCEPTER.

SPECIFICATION forming part of Letters Patent No. 460,673, dated October 6, 1891.

Application filed April 25, 1891. Serial No. 390,457. (No model.)

*To all whom it may concern:*

Be it known that I, THOMAS GRIFFITHS, civil engineer, a subject of the Queen of Great Britain and Ireland, and a resident of Sydney, in the Colony of New South Wales, Australia, have invented an Improved Grease Trap or Intercepter, of which the following is a specification.

This invention has been specially designed for the purpose of intercepting all grease, fat, or oleaginous substances that find their way from a washing-up sink into a sewer and thereby choke the same and the connections. The sink and intercepter may be inclosed in one box, or they may be made separate from one another and connected together by pipes. In the accompanying drawings the sink and intercepting-tray are shown designed all in one and not independent of one another.

Figure 1 is a vertical section of the sink and intercepter, the section being taken on the line 1 2 of Fig. 2. Fig. 2 is a vertical section of the same on the line 3 4 of Fig. 1. Fig. 3 is a sectional plan on the line 5 6 of Fig. 2.

A is the washing-up sink, which may be emptied by an ordinary downpipe or by means of a siphon, as shown in the drawings. The sink A occupies the upper part of a receptacle or box B, while the lower part of the box contains the grease trap or intercepter C, which is so arranged that the water that pours into it from the sink shall be made to travel over a considerable extent of surface. The means adopted in the drawings (having this end in view) is by dividing the tray of the intercepter into a number of separate compartments by transverse partitions D D, with openings $d$ made in the partitions at their alternate ends, so that the water that enters the tray shall be caused to take a serpentine course, as shown by the arrows in Fig. 3, along the tray of the intercepter.

E is the overflow-pipe, that is placed at the bottom of the water-course and at such a height from the bottom of the tray as to insure the openings $d$ being constantly covered by the water in the tray. (See Figs. 1 and 2.) The overflow-pipe E should discharge over a gully or outside sink. Ventilation being of considerable importance to make the apparatus work satisfactorily, the overflow-pipe E is also used as an air-inlet pipe. The cool air from outside will enter the box through the pipe E, will pass over the surface of the liquid in the intercepter, thereby cooling the same, and will enter the upper part of the box B through the opening $f$ in the partition F, that separates the upper from the lower part of the box, and from thence will pass back to the outer atmosphere by way of the pipe G, the ventilation taking the direction indicated by the wavy arrows in the drawings, Figs. 1 and 2.

The mode of operation of the apparatus is as follows: The sink A will contain the hot water used for washing up, the water being mixed up with the débris from the dishes that are being washed up and the grease from the same in a melted form. The sink will be discharged either through the siphon or the downpipe into the first compartment formed on the tray or intercepter C, the water that is already in that compartment being forced into the next compartment, and so on. It will be understood that as much water will be discharged from the intercepter-tray through the overflow-pipe E as is introduced to the intercepter from the sink, the water that overflows being cold in comparison to the water that is introduced. It has been ascertained by experiment that the water in each successive compartment is several degrees cooler than the water in the compartment just before it and from whence it has flowed but recently. Owing to the impediments to the free flow of the water caused by the partitions D, the flow of water is retarded, and the water will become comparatively still on the surface, thus allowing the grease to rise to the surface of the water above the openings $d$, where it will rapidly cool and be retained in that compartment and from whence it may be removed as a cake when the intercepter is to be cleaned.

I do not wish to confine myself exclusively to the form of intercepter C shown in the drawings. The same result may be obtained by constructing the tray with a continuous spiral or snail-shaped water-course having transverse divisions with openings at the bottom, so that the water would be impeded in its flow, as before; or a circular tray may be used with concentric divisions similar to the board used in the puzzle known as "Pigs in Clover," but with the openings in the concentric partitions close to the bottom, so as to afford the necessary impediment to the flow of the water for the purpose hereinbefore set forth. Any other arrangement of divisions may be adopted that would be suitable for the purpose, it being borne in mind that the object of having a serpentine course with divisions and openings near the bottom is to allow time for the water to cool by impeding the flow, and at the same time to skim or intercept the grease from the surface of the water, and thereby prevent it from entering the sewer.

It is not necessary to use the intercepting-tray in connection or combination with the sink A, as the greasy water from bowls or other receptacles may be emptied directly into the first compartment of the intercepting-tray.

Having now particularly described and ascertained the nature of my said invention and in what manner the same is to be performed, I declare that what I claim is—

1. A grease-intercepter consisting of a sink above the tray, and a tray that is divided by partitions into compartments, and a siphon connecting the sink and tray, each compartment being in direct communication with the next adjoining compartment by means of an opening made in the partition near the bottom of the tray, the openings in each partition being at the end farthest from the opening in the preceding partition in order to allow the water to cool, the tray being provided with an overflow-pipe placed at a height such that sufficient water will be retained in the dish or tray to cover or seal the openings $d$ in the partitions, as herein specified, and for the purposes set forth.

2. A grease-intercepter consisting of a box or receptacle containing a sink, and a dish or tray C, divided by partitions into compartments provided with alternate openings, the sink and tray being arranged one above the other and connected by a siphon, and the box being provided with an air-inlet and an air-outlet so arranged that the air arriving through the inlet shall be caused to circulate over the surface of the liquid in the tray and then exit through the outlet-pipe, thus cooling the liquid in the tray and at the same time carrying off any noxious gases or bad smells, as herein set forth.

Dated at Sydney this 21st day of March, 1891.

THOMAS GRIFFITHS.

Witnesses:
 WM. D. MASSEY,
 J. S. WHITELOCKE.